Figure 1:
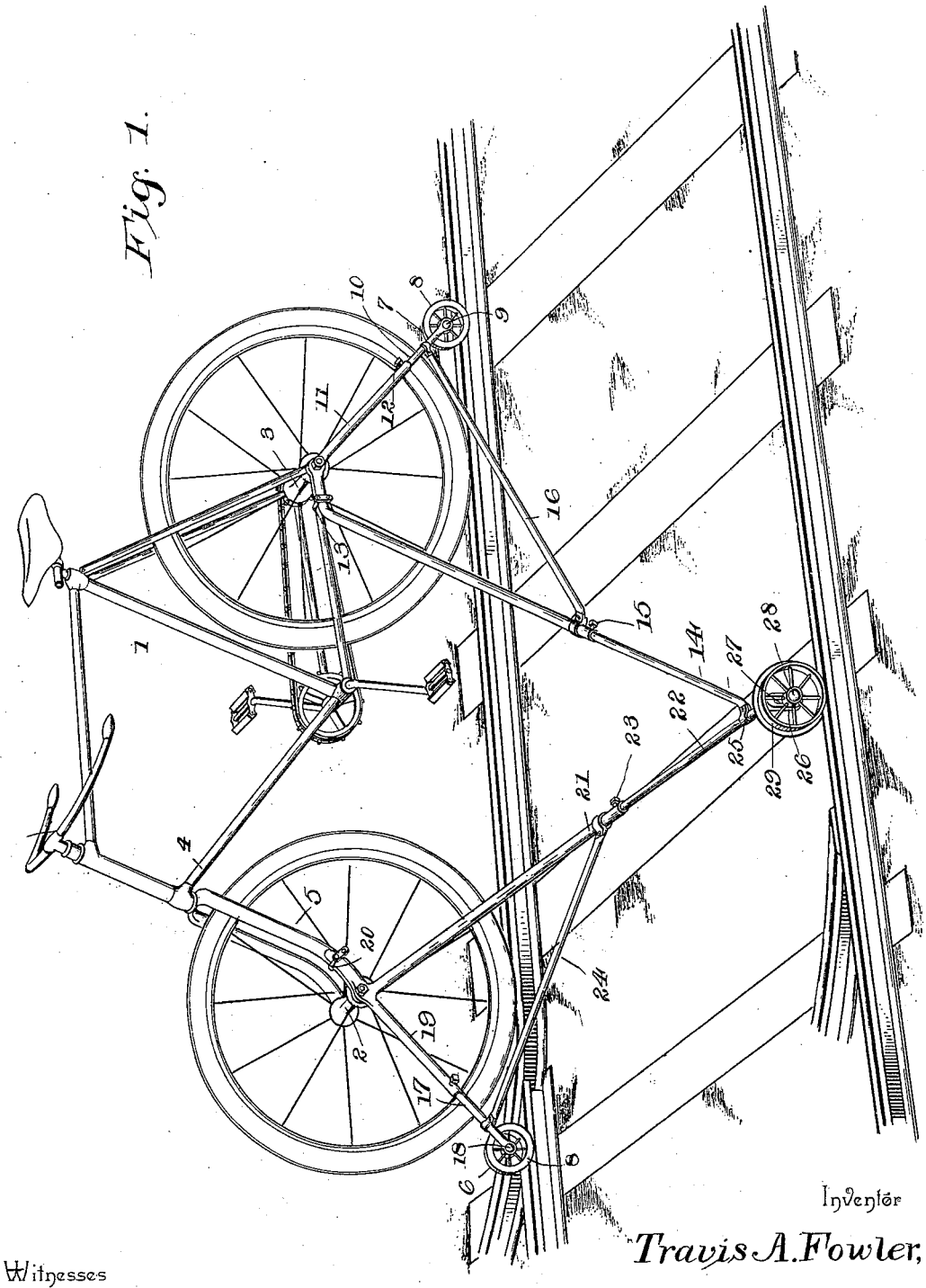

(No Model.)  
2 Sheets—Sheet 1.

T. A. FOWLER.
BICYCLE ATTACHMENT.

No. 545,474.  
Patented Sept. 3, 1895.

Witnesses  
Chas. A. Ford.  
R. M. Smith.

Inventor  
Travis A. Fowler,  
By his Attorneys.  
C. A. Snow & Co.

(No Model.) 2 Sheets—Sheet 2.
T. A. FOWLER.
BICYCLE ATTACHMENT.
No. 545,474. Patented Sept. 3, 1895.
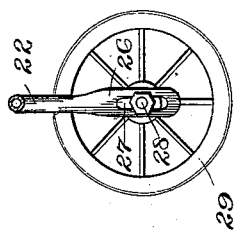
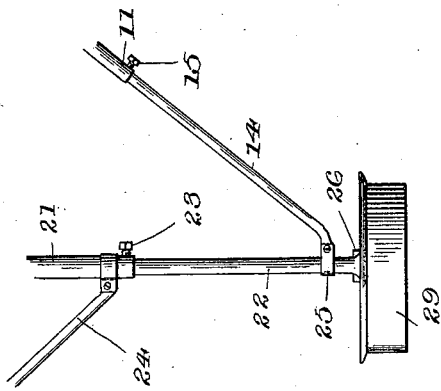
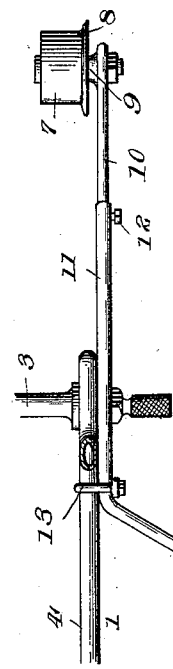
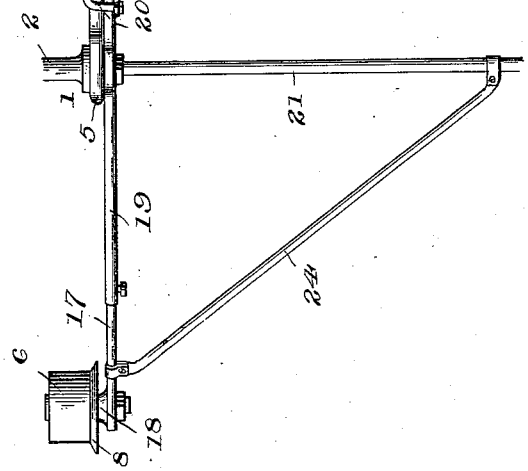
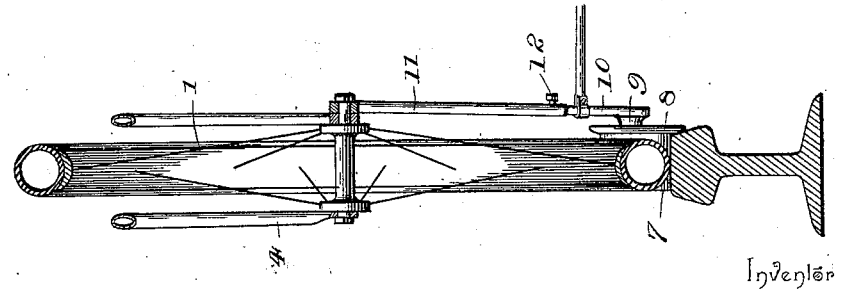
Witnesses
Chas. A. Ford.
R. M. Smith.
Inventor
Travis A. Fowler,
By his Attorneys.
C. A. Snow & Co.

UNITED STATES PATENT OFFICE.

TRAVIS A. FOWLER, OF HILLSDALE, MICHIGAN.

BICYCLE ATTACHMENT.

SPECIFICATION forming part of Letters Patent No. 545,474, dated September 3, 1895.

Application filed June 4, 1895. Serial No. 551,631. (No model.)

*To all whom it may concern:*

Be it known that I, TRAVIS A. FOWLER, a citizen of the United States, residing at Hillsdale, in the county of Hillsdale and State of Michigan, have invented a new and useful Bicycle Attachment, of which the following is a specification.

This invention relates to an improvement in attachments for safety-bicycles, and has for its object to provide a simple and inexpensive form of attachment for bicycles, whereby the same may be adapted to be supported and ridden upon a railway-track.

A further object of the invention is to construct such an attachment in a manner that will adapt it to be folded into compact shape for transportation, so that it may be strapped upon the machine, if desired, and to make certain parts thereof extensible, so that the attachment may be applied to bicycles having wheels of different diameter and having different lengths of wheel-bases.

A further object is to arrange and support the flanged and guiding track-wheels in such manner that they will have a rigid connection with the frame of the bicycle, adapting the latter to be ridden around curves and across the open spaces at frogs and switches.

A further object is to construct the frame of the attachment in such manner that the side balancing-wheel, or the wheel which travels upon the opposite rail to that upon which the bicycle runs, may be adjusted in height for the purpose of tilting said bicycle to any desired angle.

Other objects and advantages of the invention will be set forth in the subjoined description.

In order to accomplish the objects above enumerated, the invention consists in certain novel features and details of construction and arrangement of parts, as hereinafter fully described, illustrated in the drawings, and finally embodied in the claims.

In the accompanying drawings, Figure 1 is a perspective view of a bicycle having my improved railway attachment applied thereto, showing also a sufficient portion of a road-bed to illustrate the manner in which the attachment is utilized. Fig. 2 is a vertical transverse section through one of the wheels of the bicycle, showing also a portion of the frame of the attachment and one of the flanged track-wheels in position upon the rail. Fig. 3 is an enlarged detail plan view of the rear portion of the attachment, showing the manner in which it is connected with the machine-frame. Fig. 4 is a similar view of the forward portion of said frame, showing the front track-wheel. Fig. 5 is a detail plan view of the side balancing track-wheel, showing also a portion of the telescopic frame of the attachment. Fig. 6 is an inside elevation of the same, showing the manner in which said wheel is adjusted vertically relatively to the frame of the attachment.

Similar numerals of reference designate corresponding parts in the several figures of the drawings.

Referring to the acccompanying drawings, 1 designates a bicycle of that type or class known as "safeties." This bicycle is provided with the usual front and rear axles 2 and 3, respectively, and also with the usual frame 4 and front steering-fork 5, the parts referred to and having said numerals applied being the parts utilized in the attachment of the device about to be described.

This invention contemplates the use of two track-rollers 6 and 7, located, respectively, in front of the front wheel of the bicycle and in rear of the rear wheel thereof. Each of said track-rollers is formed with a wide tread, as indicated, and also with a peripheral flange 8 upon its inner side adapted to bear against and run in contact with the inner face or side of the head of the rail upon which the bicycle runs. By providing the track-rollers 6 and 7 with wide treads and flanges upon their inner sides only, sufficient play is allowed for said rollers or wheels to accommodate themselves accurately to the rail, and also to pass over frogs and switches and to travel around curves. In devices of this nature, as heretofore constructed, the track rollers or wheels have been mounted loosely and adapted to yield with relation to the bicycle and its wheels, and it is in just this respect that they have failed to be of practical value, for the reason that where said rollers or wheels are capable of yielding they form no vertical support for the machine-wheels, and as a result the latter are permitted to drop into the spaces adjacent to frogs and switches, the result of which is to derail the machine and do considerable damage. To overcome this difficulty, I support the rollers or wheels 7 in rigid relation to the machine frame and wheels. Under such an arrangement it will be seen that the front wheel of the machine will act as a support as the front roller or track-wheel passes over a switch or frog, after which the track wheel or roller will act as a support for the machine-wheel. In the same manner the rear wheel of the machine as it passes over a frog or switch will be supported by the rear roller or track-wheel and will in turn afterward support the rear track wheel or roller. By this arrangement all of the wheels will be supported in such manner that none of them can drop into the spaces adjacent to frogs, switches, and other irregularities in railway-beds. The rear roller or track-wheel 7 is mounted upon a horizontal stud-shaft 9, carried by the lower end of a rearwardly and downwardly inclined bar or frame-piece 10. The bar or frame-piece 10 is preferably made of tubing and is adapted to slide or telescope within a corresponding bar or frame-piece 11, also tubular in cross-section, the two members of this portion of the frame of the attachment being held at the desired adjustment by means of a set-screw 12. The tubular bar or frame-piece 11 extends upwardly and reaches to the rear axle 3 of the machine, where it is preferably flattened and perforated to take over said axle, a nut being applied to the threaded end of the axle outside of said flattened portion of the bar 11. The bar 11 extends forward of the axle 3 and in alignment with the lower horizontal members of the diamond frame of the bicycle a short distance, adapting a clip 13 to be passed around said bar and the frame of the machine for securing the parts firmly together. By means of this double connection it will be seen that the telescopic bar or frame-piece 10 and 11 has a rigid relation to the frame of the bicycle. From the point where the bar or frame-piece 11 of the attachment is secured to the bicycle-frame by means of the clip 13 said bar or frame-piece is extended forwardly and outwardly and also slightly downwardly, as indicated in Figs. 1 and 2, and, being tubular, is adapted to receive a smaller tubular and telescopic section 14, which slides within the bar 11 and is held at any adjustment by means of a set-screw 15. A brace 16 extends diagonally between the arm or frame-piece 10 and the forwardly and outwardly inclining bar 11 for the purpose of strengthening this portion of the frame of the attachment.

The forward member of the attachment-frame comprises a downwardly and forwardly inclining bar or frame-piece 17, carrying at its lower end a horizontal stud-shaft 18, upon which the forward roller or track-wheel 6 is journaled. The bar 17 is tubular and slides or telescopes within a tubular bar or frame-piece 19, which at its upper end is perforated to engage the forward axle 2 of the machine. Above the point where said bar or frame-piece 19 is connected with the axle the same is extended in line with the front fork 5 a sufficient distance to adapt it to receive a clip 20, similar to that, 13, above described. By providing two rigid points of attachment for the bar or frame-piece 19 and 17 it will be seen that the forward roller or track-wheel 6 will be held in rigid relation to the machine-frame. The forward member of the attachment is also provided with a laterally and downwardly extending tubular bar 21, which receives a sliding telescopic section 22, which may be adjusted relatively to the bar 21 and held by means of a set-screw 23.

24 indicates a brace, which extends between and connects the bar 17 and the frame-piece 21, serving to materially strengthen the forward member of the attachment. The telescopic section 14 of the bar or frame-piece 11 is provided at its outer end with an eye or strap 25, which embraces and clamps firmly around the telescopic section 22, just described.

The outer end or extremity of the telescopic section or bar 22 is bent downwardly, as shown at 26, and formed with a vertically-elongated slot 27, which is adapted to receive the shaft or stud 28, upon which the balancing flanged wheel or roller 29 is journaled. The flanged wheel or roller 29 runs upon the rail opposite to that upon which the bicycle travels, and by means of the slotted vertical portion 26 of the section or bar 22 of the frame it will be seen that the height of said balancing wheel or roller may be adjusted as desired for giving the proper inclination to the machine. By this means the machine may be held perfectly upright or it may be inclined slightly toward the center of the track.

By means of the construction above described it will be apparent that the attachment may be adjusted to wheels of different sizes and that the attachment may be changed to accommodate itself to road-beds of different gages. It will be apparent, also, that by mounting and supporting the rollers and track-wheels 6 and 7 in rigid relation to the machine-frame and its wheels said track-wheels and machine-wheels will mutually support each other in passing over frogs, switches and other irregularities in the road-bed. By means of the attachment being made in several telescopic sections and by making the diagonal braces 16 and 24 removable, as shown, it will be apparent that the device may be folded into compact shape, adapting the same to be strapped or otherwise secured to and carried upon the frame of the bicycle. Being composed entirely of tubing, the frame of the attachment is very light and at the same time very strong and durable.

Changes in the form, proportion, and minor details of construction may be resorted to without departing from the spirit or sacrificing any of the advantages of this invention.

Having thus described the invention, what is claimed as new, and desired to be secured by Letters Patent, is—

1. An attachment for bicycles, comprising a pair of telescopic bars or frame pieces secured rigidly to the frame of the bicycle and provided with rollers or track wheels adapted to engage with and roll upon the head of a rail, and a suitable laterally projecting frame provided with a flanged wheel for engaging and rolling upon the opposite rail of the track, substantially as and for the purpose described.

2. In an attachment for bicycles, a pair of telescopic bars or frame pieces each provided with a flanged roller or track wheel at its lower end and having a perforation for the reception of one of the axles of the machine, an extension upon each of said arms in line with portions of the frame of the machine, and a suitable clip or clamping device for engaging said extensions with the machine frame, in combination with laterally extending bars or frame pieces carrying a flanged roller or wheel for engaging the opposite rail of the track, substantially as specified.

3. In an attachment for adapting bicycles to be ridden upon a railway, a pair of inclined rigid arms extending in advance and in rear of the machine frame and provided with rollers or track wheels for engaging one of the rails, in combination with laterally and diagonally extending bars or frame pieces carrying a balancing track wheel adapted to engage the opposite rail, and the oblique braces interposed between said forwardly and rearwardly extending rigid arms and the laterally and obliquely extending bars or frame pieces, all arranged substantially as and for the purpose described.

4. An attachment for bicycles, comprising a laterally projecting frame secured rigidly to the machine frame and provided with a vertically extending and slotted portion or arm, in combination with a balancing track wheel mounted upon a shaft or axle adjustable vertically with relation to said vertical portion or arm of the frame, substantially as and for the purpose specified.

In testimony that I claim the foregoing as my own I have hereto affixed my signature in the presence of two witnesses.

TRAVIS A. FOWLER.

Witnesses:
R. S. HARDING,
A. L. FOWLER.